United States Patent [19]

Peuckert

[11] Patent Number: 5,188,781
[45] Date of Patent: Feb. 23, 1993

US005188781A

[54] SILICON NITRIDE CERAMIC AND A PROCESS FOR ITS PREPARATION

[75] Inventor: Marcellus Peuckert, Hofheim am Taunus, Fed. Rep. of Germany

[73] Assignee: Hoechst Aktiengesellschaft, Frankfurt am Main, Fed. Rep. of Germany

[21] Appl. No.: 772,595

[22] Filed: Oct. 7, 1991

Related U.S. Application Data

[63] Continuation of Ser. No. 404,689, Sep. 8, 1989, abandoned.

[30] Foreign Application Priority Data

Sep. 10, 1988 [DE] Fed. Rep. of Germany ....... 3830851

[51] Int. Cl.$^5$ .................... C04B 325/58; F04D 29/26
[52] U.S. Cl. ....................................... 264/65; 264/66; 501/98; 501/97
[58] Field of Search .................. 501/97, 98; 264/65, 264/66

[56] References Cited

U.S. PATENT DOCUMENTS

| | | | |
|---|---|---|---|
| 4,102,698 | 7/1978 | Lange et al. | 501/98 |
| 4,234,343 | 11/1980 | Andersson | 501/98 |
| 4,280,850 | 7/1981 | Smith et al. | 501/97 |
| 4,285,895 | 8/1981 | Mangels et al. | 501/98 |
| 4,388,414 | 6/1983 | Mangels et al. | 501/98 |
| 4,500,482 | 2/1985 | Häther | 264/65 |
| 4,501,723 | 2/1985 | Ezis et al. | 501/98 |

FOREIGN PATENT DOCUMENTS

| | | |
|---|---|---|
| 0237261 | 9/1987 | European Pat. Off. |
| 0250153 | 12/1987 | European Pat. Off. |
| 2910943 | 9/1980 | Fed. Rep. of Germany |
| 52-30811 | 3/1977 | Japan |
| 50944 | 9/1983 | Japan |

OTHER PUBLICATIONS

Eiji Tani et al., "Gas Pressure Sintering of Si$_3$N$_4$ with an Oxide Addition", Yogyo-Kyokai-Shi, Journal of the Ceramic Society of Japan, vol. 94, No. 2, (1986) p. 303.
Chemical Abstract 87:10354d.

Primary Examiner—Mark L. Bell
Assistant Examiner—C. M. Bonner
Attorney, Agent, or Firm—Curtis, Morris & Safford

[57] ABSTRACT

A process for the preparation of an Si$_3$N$_4$ ceramic of high strength, wherein α-Si$_3$N$_4$ powder is mixed with small amounts of at least one of the elements La, Ce, Pr, Nd, Sm, Eu, Gd, Tb, Dy, Ho and Y in form of an oxide or oxide precursor, the mixture is shaped to a shaped body and the shaped body is sintered under pressures of 1-100 bar in a nitrogen atmosphere at temperatures of 1,750°-2,000° C. is described.

The sintered body is heated at temperatures of 1200°-1500° C. in an inert gas atmosphere for at least 10 hours and then cooled. During this procedure, crystalline apatites of the formula A$_{4+x}$(SiO$_4$)$_3$N$_x$, A denoting the element added in the form of the oxide or oxide precursor and x denoting a number which is greater than zero and not more than 1.

1 Claim, No Drawings

SILICON NITRIDE CERAMIC AND A PROCESS FOR ITS PREPARATION

This application continuation of application Ser. No. 07/404,689, filed Sep. 8, 1989, now abandoned.

The present invention relates to a process for the preparation of an $Si_3N_4$ ceramic of high strength at low and high temperatures by sintering powder mixtures containing silicon nitride and additives. The invention furthermore relates to silicon nitride shaped bodies which can be produced by this process and contain, in the intergranular phase, certain nitrogen-containing silicates having the crystal structure of apatite.

Because of its high strength, silicon nitride is an important material for numerous uses in mechanical engineering. As well as a high strength at room temperature, a high strength at temperatures above 1,000° C. is also sought here. Silicon nitride ceramic is general prepared from $\alpha$-$Si_3N_4$ powdered by mixing, grinding, shaping and finally sintering, using oxidic sintering additives such as MgO, $Al_2O_3$ or $Y_2O_3$. Shaping can be effected, for example, by means of pressing or slip casting or by injection molding. Sintering is carried out in a nitrogen atmosphere under normal pressure or an increased pressure up to about 100 bar or by means of hot isostatic pressing under pressures up to 2,000 bar. The sintering temperatures are in the range from 1,750° to 2,000° C. 5 to 20% by weight of oxidic sintering auxiliaries are usually added to the silicon nitride, depending on the sintering process used, less sintering auxiliaries being required the higher the pressure and temperature chosen. After sintering these sintering auxiliaries are present in the silicon nitride ceramic in the form of an amorphous intergranular vitreous phase.

It is already known that at a certain composition crystalline phases can crystallize out of this amorphous intergranular phase during sintering. If $Y_2O_3$ is used as a sintering auxiliary, for example $Y_4Si_2O_7N_2$ ($Si_3N_4$/$SiO_2$/$4Y_2O_3$), $YSiO_2N$ ($Si_3N_4$/$SiO$ 2/$2Y_2O_3$) or $Y_{10}Si_7O_{23}N_4$ ($Si_3N_4$/$4SiO_2$/$5Y_2O_3$) can form (U.S. Pat. No. 4,388,414). The formation of these Y-containing crystalline phases has a favorable effect on the resistance to oxidation and to a minor degree also on the strength at high temperatures. Other phases, such as $Y_2Si_2O_7$ and $Y_2SiO_5$ or, if aluminum oxide is added, also $Y_3Al_5O_{12}$ and $Y_4Al_2O_9$, can on principle likewise also crystallize out, since they exist in the quinquinary phase system Si-Al-Y-O-N. These phases generally lead to an improvement in the strength at high temperatures above 1,000° C., because the amorphous phase content and therefore the tendency to creep is decreased. Although oxides of almost all the rare earths have been used as sintering auxiliaries for $Si_3N_4$, no findings in respect of an increase in strength as a result of crystallization of specific phases have yet been disclosed. In contrast, according to another literature reference, addition of cerium oxide has the effect, during crystallization of the vitreous phase, of reducing the strength of AlN-containing silicon nitride bodies in the range from room temperature up to about 900° C. (J. Mukerjo et al., Ceram. Int. 13 (1987), 215).

There was therefore the object of providing a process with which the strength of a silicon nitride ceramic can be improved not only at high temperatures but also at low temperatures. The present invention achieves this object.

It is based on the knowledge that after sintering the ceramic after-treatment with heat at a somewhat lower temperature (1,200° to 1,500° C.) leads to nitrogen-containing silicates of the rare earth or yttrium having the apatite structure crystallizing out, and that the strength at lower temperatures is also favorably influenced during this procedure.

A process has now been found for the preparation of an $Si_3N_4$ ceramic of high strength, wherein every 100 g of $\alpha$-$Si_3N_4$ powder are mixed with 0.02 to 0.2 mol of at least one of the elements La, Ce, Pr, Nd, Sm, Eu, Gd, Tb, Dy, or Ho, or with 0.1 to 0.2 mol of Y in the form of the oxides or oxide precursors, the mixture is shaped to a shaped body and the shaped body is sintered under pressures of at least 1 to 100 bar in a nitrogen atmosphere at temperatures of 1,750° to 2,000° C. This process comprises heating the sintered body at temperatures of 1,200° to 1,500° C. for at least 10 hours in an inert gas atmosphere for formation of crystalline apatites of the formula $A_{4+x}(SiO_4)_3N_x$ and subsequently cooling it, A denoting the element added in the form of the oxide or oxide precursor and x denoting a number which is greater than 0 and not more than 1. The inert gas atmosphere can consist of, for example, nitrogen or argon. Compounds which react under the sintering conditions to give the corresponding oxides, in particular the hydroxides and nitrates, can in general be employed as the oxide precursors. The preparation from acetates, formates, oxalates and carbonates of the metals mentioned furthermore proves to be favorable. Additions of Sm, Eu, Gd, Tb, Dy, Ho and Y are preferred, since particularly high strength can be achieved with these.

Surprisingly, both the strength at room temperature and the strength above a 1,000° C. are substantially increased by the tempering step. The after-treatment with heat should last at least 10 hours. Reaction times of 20 hours or longer are preferred. The after-treatment can be carried out directly in the cooling phase after sintering at 1,750° to 2,000° C. However, it is also possible for sintered and cooled samples to be heated up again to the temperature of the after-treatment with heat.

The duration of sintering is typically 0.5 to 5 hours.

The oxygen content of the silicate which crystallizes out probably originates partly from the thin $SiO_2$ films which cover the $\alpha$-$Si_3N_4$ employed. Commercially available $Si_3N_4$ usually contains 0.05 to 2% by weight of oxygen. It is appropriate to top up the amount of $SiO_2$ required for complete apatite formation in the batch.

The after-treatment with heat is preferably carried out at temperatures from 1,200° to 1,400° C. At higher temperatures there is the risk that the apatite melts again, and at lower temperatures the crystallization requires too long a period of time. The formation of a crystalline apatite can be detected by means of x-ray diffraction. The d values of the x-ray diffraction reflections of such nitrogen-containing apatites have not yet been described, with the exception of Y and Sm.

However, it has been found that the d values show a linear dependence on the ionic radius of the trivalent cations employed. Identification of apatites which have not yet been described is therefore possible. Table 1 lists the d values of the (200)- and (211)-x-ray reflections of the apatites $A_{4+x}(SiO_4)_3N_x$ and compares them with the ionic radius of the corresponding $A^{3+}$ion.

It has not been possible for the value of x to be determined exactly for the novel apatites; however, it is greater than 0, less than 2 and probably close to 1. This is also suggested by analogy to the known Y and Sm apatites.

In order to achieve an intimate mixture of $Si_3N_4$ powder and doping substances, it is advantageous to grind the mixture of components together for a relatively long time.

It is already known from E. Tani et al. (Yogyo-Kyokai-Shi 94 (2), 1986, page 303) that analogous apatites of the formula $La_5(SiO_4)_3N$ and $Y_5(SiO_4)_3N$ can occur in an $Si_3N_4$ ceramic. However, it has not previously been disclosed that crystallization of such apatites in the intergranular phase of the ceramic is promoted by tempering at temperatures below the sintering temperature.

It has furthermore been found that this crystalline phase leads to a significant increase in strength both at room temperature and at temperatures above 1,000° C. No similar increase in strength at room temperature has been observed with any of the other previously known crystalline intergranular phases, such as, for example, $Y_3Al_5O_{12}$, $Y_2Si_2O_7$, $Y_2SiO_5$, $Y_4Si_2O_7N_2$ or $YSiO_2N$.

It has furthermore found that the corresponding apatite which is derived from Y lies at the limit of the range of existence of the apatite phase. Depending on the composition (content of $Al_2O_3$) and tempering conditions, several other Y-containing crystalline phases can crystallize out in this case in a kinetically controlled manner, in addition to the apatite, for example $Y_3Al_5O_{12}$ (=Y-Al garnet) or the silicates $Y_2Si_2O_7$ and $Y_2SiO_5$. Only apatite effects an increase in strength. If the rare earth oxides $Er_2O_3$ and $Yb_2O_3$ are used as sintering additives, under an otherwise identical preparation process, as found in experiments, it is not the corresponding Er apatite or Yb apatite which crystallizes out but $Er_2SiO_5$ or a Yb silicate of unknown structure, which is characterized by the d values 3.93, 3.50, 3.02, 2.98, 2.90, 2.52, 2.45 and $2.27 \times 10^{-8}$ cm of the x-ray diffraction reflections between 2 theta=10 and 40 degrees.

Amounts of additives which are favorable for crystallization of the apatite are, based on 100 g of $Si_3N_4$, about 0.01 to 0.1 mol of the oxide $A_2O_3$, corresponding to 0.02 to 0.2 mol of the corresponding additional element from the rare earth series. Addition of 0 to about 0.03 mol of $Al_2O_3$ per 100 g of $Si_3N_4$ do not substantially alter the tendency of the apatite to crystallize out. Larger amounts of $Al_2O_3$ (at least 4% by weight) prevents spontaneous crystallization during sintering and tempering. The operation is preferably carried out without the addition of AlN.

In the specific case of Y, the amounts of additives in the mixture which promote formation of the strength-increasing Y apatite are at least 12% by weight of $Y_2O_3$ (corresponding to 0.12 mol of Y/100 g of $Si_3N_4$). If the ceramic contains no $Al_2O_3$, some of the apatite corresponding to the oxide added already crystallizes out during sintering. Nevertheless, in this case also a further increase in strength and the formation of further apatite is still possible by the after-treatment with heat described. An after-treatment with heat leads to crystallization of the apatite.

The actual mechanism of the increase in strength by the apatite (in contrast to the other known crystalline intergranular phases) is unknown.

Thus, it also cannot explained why, when aluminum oxide is added as a second sintering additive (at atomic ratios of A:Al or 1:0 to 1:1 and absolute amounts up to 0.03 mol of $Al_2O_3$/100 g of $Si_3N_4$), no aluminate of the rare earths but only the aluminum-free apatite crystallizes out.

Because of its high strength in the entire temperature range from room temperature to above 1,000° C., the silicon nitride ceramic prepared according to the invention is outstandingly suitable as a material in mechanical engineering, in particular for the production of components for internal combustion engines, such as, for example, turbo charger rotors.

The invention is illustrated in more detail by the examples.

COMPARISON EXAMPLES 1 TO 12

Powders of $\alpha$-$Si_3N_4$ (average particle size 0.5 $\mu$m; 95% $\alpha$-modification, 5% $\beta$-modification, 2.5% content of $SiO_2$), an oxide of the rare earth and if appropriate also aluminium oxide were mixed intensively in isopropanol and deagglomerated under wet conditions in an attrition mill and ground. After the slip had been dried in a rotary evaporator, the powder treated in this way was pressed isostatically under a pressure of 300 MPa in a silicone die to give a green body about 60×20×15 mm in size. This green body was heated up to 1,800° C. under 1 bar of nitrogen in the course of 90 minutes, kept at 1,800° C. isothermally for one hour and sintered, and then cooled again to room temperature in the course of about 3 hours. Test bars having the dimensions 4.5×3.5×45 mm were sawn out of the sintered ceramic bodies using a diamond saw and were polished. The strength $F_B$ of the test bars was investigated in a 4-point bending strength test with a 20/40 mm support (USA Mil, STD 1942) both at room temperature and at 1,200° C. in air.

The compositions of the powder mixtures employed and the strength values $F_B$ (mean values) measured on the sintered bodies are listed in Table 2.

EXAMPLES 13 TO 22 AND COMPARISON EXAMPLES 23 AND 24

Silicon nitride ceramic bodies were produced in accordance with Comparison Examples 1 to 12. They were then subjected to after-treatment with heat in a nitrogen atmosphere of 1 bar. During this, the bodies were heated up to 1350° C. in the course of one hour, kept at 1350° C. isothermally for 24 hours and then cooled again to room temperature in the course of 3 hours. The 4-point bending strength was determined as in Comparison Examples 1 to 12. The measurement values (mean values) obtained are listed in Table 3. Examples 23 and 24 are Comparison Examples.

RESULT

Generally, Examples 13 to 22, compared with Comparison Examples 1 to 10, show that by tempering the strength is increased and the formation of corresponding apatites is promoted.

Comparison Example 5 shows that in a batch without $Al_2O_3$, some of the apatite already crystallizes out during sintering. Example 17 shows that the strength can be increased still further by after-treatment with heat.

Several crystalline phases ($Y_3Al_5O_{12}$, $Y_2SiO_5$, and $Y_{10}Si_3Al_2O_{18}N_4$) were observed in Comparison Example 10. It is found that (without tempering) high contents of Y (0.16 mol of Y/100 g of $Si_3N_4$) together with $Al_2O_3$ lead to the formation of bodies which have only a low strength. In contrast, Example 22 shows that these phases dissolve again, apart from Y-Al garnet ($Y_3Al_5O_{12}$), during tempering, and Y apatite is formed instead. Bodies with significantly increased strength are in this way obtained. From this, is can be concluded that contents of apatite are advantageous for high strength.

If the amounts of Y are low (Comparison Experiment 11), no crystalline phases are formed without tempering. The strength of the bodies at room temperature is in this way increased (in comparison with Comparison Example 10), and the strength at higher temperatures is reduced. On the other hand, if tempering is carried out (Comparison Example 23), Y-Al garnet and $Y_2Si_2O_7$, are formed. The strength is not substantially influenced by the tempering in this case.

Comparison Examples 12 and 24 show that when $Er_2O_3$ is employed as a sintering auxiliary, the strength of the ceramic after-treated with heat is reduced significantly in comparison with the ceramic which has been merely sintered, since $Er_2SiO_5$ and no Er apatite crystallizes out as a result of the after-treatment with heat.

In Example 16, powders were sintered with addition of 0.11 mol of Sm (in the form of the oxide) /100 g of $Si_3N_4$ and 0.027 mol of $Al_2O_3$/100 g of $Si_3N_4$. After tempering, the apatite $Sm_5(SiO_4)_3N$ was detected by means of x-ray diffraction of Cu-Ka radiation. The following x-ray diffraction lines (above $d=2.5\times10^{-8}$ cm) were observed: d=4.76; 4.13; 3.94; 3.48; 3.21; 3.12; 2.85; 2.81 and 2.76. These values agree with the known values of the JCPDS card No. 27-1,400.

TABLE 1 d values of the x-ray diffraction reflections of the apatites $A_{4+x}(SiO_4)_3N_x$ and radii of the ions $A^{3+}$

| A | d(200) | d(211) | Ionic radius [$10^{-8}$ cm] |
|---|---|---|---|
| Y | 4.08 | 2.81 | 0.893 |
| La | 4.23 | 2.92 | 1.061 |
| Ce | 4.21 | 2.90 | 1.034 |
| Pr | 4.20 | 2.90 | 1.013 |
| Nd | 4.17 | 2.87 | 0.995 |
| Sm | 4.13 | 2.85 | 0.964 |
| Eu | 4.12 | 2.84 | 0.950 |
| Gd | 4.11 | 2.83 | 0.938 |
| Tb | 4.10 | 2.82 | 0.923 |
| Dy | 4.08 | 2.81 | 0.923 |
| Ho | 4.07 | 2.80 | 0.894 |

TABLE 2

Silicon nitride ceramics prepared, sintered

| Example No. | Batch* [% by weight] A oxide | $Al_2O_3$ | $F_B$ 25° C. [MPa] | $F_B$ 1200° C. [MPa] | Secondary crystalline phases |
|---|---|---|---|---|---|
| 1 | 11.5 $CeO_2$ | 2.3 | 323 | 159 | — |
| 2 | 12.4 $Pr_6O_{11}$ | 2.3 | 466 | 202 | — |
| 3 | 14.9 $Nd_2O_3$ | 2.3 | 386 | 272 | — |
| 4 | 15.5 $Sm_2O_3$ | 2.3 | 538 | 313 | — |
| 5 | 24.2 $Gd_2O_3$ | — | 276 | 180 | Little Gd apatite*** |
| 6 | 16.1 $Gd_2O_3$ | 2.3 | 377 | 224 | — |
| 7 | 14.2 $Tb_4O_7$ | 2.3 | 507 | 306 | — |
| 8 | 16.5 $Dy_2O_3$ | 2.3 | 547 | 311 | — |
| 9 | 11.0 $Ho_2O_3$ | 3.0 | 562 | 341 | — |
| 10 | 15.0 $Y_2O_3$ | 3.2 | 413 | 480 | $Y_{10}Si_3Al_2O_{18}N_4$ $Y_2SiO_5$, YAG** |
| 11 | 10.0 $Y_2O_3$ | 2.3 | 612 | 329 | — |
| 12 | 17.0 $Er_2O_3$ | 2.3 | 628 | — | — |

Notes:
*Remainder $Si_3N_4$
**YAG = Y-Al garnet $Y_3Al_5O_{12}$
***A apatite = $A_{4+x}(SiO_4)_3N_x$ with x about 1

TABLE 3

Silicon nitride ceramics prepared, sintered and tempered

| Example No. | By tempering the sintered body of Example | $F_B$ 25° C. [MPa] | $F_B$ 1200° C. [MPa] | Secondary crystalline phases |
|---|---|---|---|---|
| 13 | 1 | 439 | 326 | Ce-apatite |
| 14 | 2 | 494 | 405 | Pr-apatite |
| 15 | 3 | 410 | 332 | Nd-apatite |
| 16 | 4 | 554 | 460 | Sm-apatite |
| 17 | 5 | 337 | 265 | abundant Gd-apatite |
| 18 | 6 | 392 | 283 | Gd-apatite |
| 19 | 7 | 555 | 436 | Tb-apatite |
| 20 | 8 | 584 | 422 | Dy-apatite |
| 21 | 9 | 612 | 487 | Ho-apatite |
| 22 | 10 | 588 | 644 | Y-apatite, YAG |
| 23 (Comparison) | 11 (Comp.) | 584 | 325 | YAG, $Y_2Si_2O_7$ |
| 24 (Comparison) | 12 (Comp.) | 500 | — | $Er_2SiO_5$ |

I claim:
1. An improved process for the preparation of a silicon nitride ceramic, $Si_3N_4$, of high strength of at least 554 MPa at room temperature and of at least 422 MPa at 1200° C., which comprises:

mixing with every 100 grams of $\alpha$-$Si_3N_4$ powder, 0.02 to 0.2 mol of at least one rare earth element Sm. Tb, Dy or Ho, or 0.12 to 0.2 mol of Y, as an oxide or oxide precursor;

shaping the mixture; and sintering the shaped body under pressures of at least 1 to 100 bar in a nitrogen atmosphere at temperature of 1750° to 2000° C., wherein the improvement comprises:

heating the sintered body at temperatures of 1200° to 1400° C. for at least 10 hours in an inert gas atmosphere to form a crystalline apatite of the formula $A_{4+x}(SiO_4)_3N_x$ wherein A is said rare earth element or Y added as an oxide or oxide precursor and x is a number which is greater than 0 and not more than 1; and cooling said sintered body.

* * * * *